June 13, 1961 H. BOUCHER 2,987,823
MEASURING DEVICE
Filed May 12, 1959 2 Sheets-Sheet 2

INVENTOR.
Harry Boucher
BY Victor J. Evans & Co.
ATTORNEYS

United States Patent Office 2,987,823
Patented June 13, 1961

2,987,823
MEASURING DEVICE
Harry Boucher, Box 1849, Odessa, Tex.
Filed May 12, 1959, Ser. No. 812,731
5 Claims. (Cl. 33—134)

This invention relates to measuring instruments where the travel of an object rotates an element and the rotating element actuates a scribe or pointer for recording the travel of the object on a graph or travelling tape, or the like, and in particular, an instrument for measuring and accurately indicating and recording the footage in well-drilling, particularly for oil and gas, in which a line attached to an object, such as a drill head, and wrapped around a drum, and attached to a spring-loaded reel, rotates a cam that actuates a pointer or scribe, whereby the scribe records each revolution of the cam on a graph or travelling tape.

The purpose of this invention is to provide a footage-indicating and recording instrument, designed to be used in combination with well-drilling, where an accurate record of the breaks in formations is desired.

Various types of instruments have been provided for indicating and recording footage as lines are drawn therethrough. However, it is difficult to accurately convert rotary motion to a marker for indicating footage on an elongated tape or graph. With this thought in mind, this invention contemplates a line, extended from a spring-loaded reel, around a drum having a cam-actuated marker or scribe in combination therewith, and attached to an object, wherein means are provided for releasing the cam from the drum when drilling is suspended.

The object of this invention is, therefore, to provide a footage-indicating and recording instrument that is designed to be used in combination with well-drilling apparatus now in use.

Another object of the invention is to provide a measuring instrument for use in combination with well-drilling, wherein operation of the measuring instrument is at the will of the operator.

A further object of the invention is to provide a footage-indicating and recording instrument for use in well-drilling, in which the instrument is of a simple and economical construction.

With these and other objects and advantages in view, the invention embodies a shaft, a cam assembly in which the shaft is rotatably mounted, a drum assembly positioned around the shaft, a clutch assembly mounted between the shaft and drum assembly for operatively connecting the drum assembly to the shaft, a cam on the end of the shaft opposite to the end on which the drum assembly is positioned, and a scribe operatively connected through a series of levers to the cam, whereby the scribe indicates and records each revolution of the cam.

Other features and advantages of the invention will appear from the following description, taken in connection with the drawings, wherein.

Figure 1:
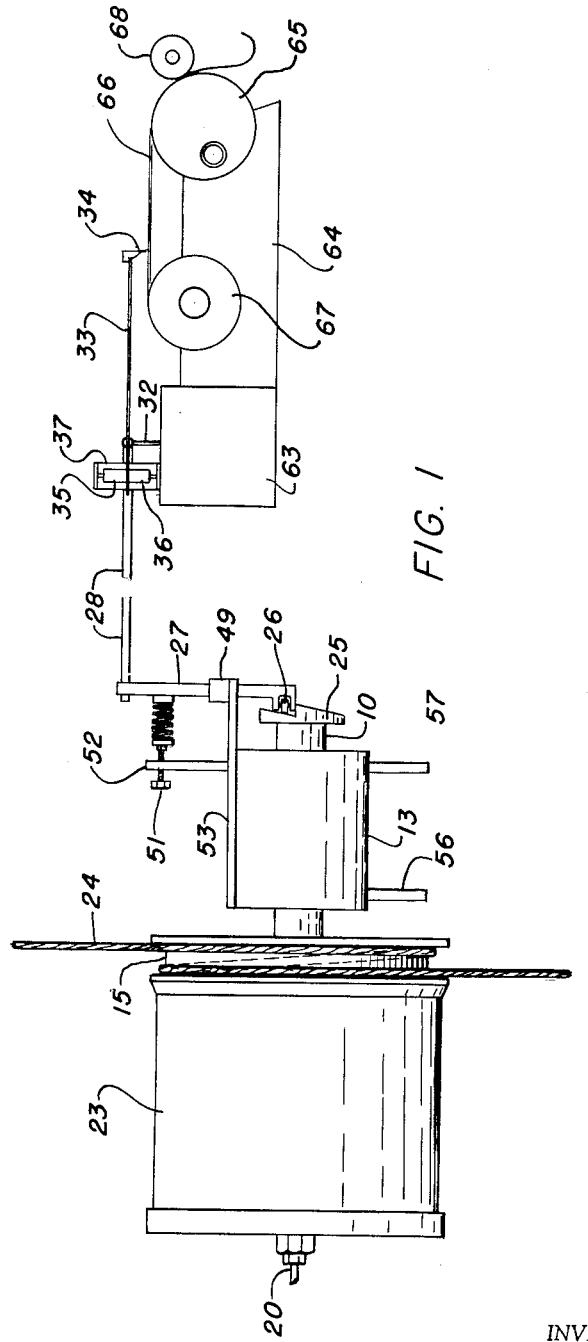
FIGURE 1 is a diagrammatic view, illustrating a typical assembly of the measuring instrument, showing a drum assembly having a clutch therein in combination with a cam assembly, and in which the cam of the cam assembly actuates a scribe for recording on a travelling tape.

Referring now to the drawings, wherein like reference characters denote corresponding parts, the improved measuring instrument of this invention includes a shaft 10, rotatably mounted by bearings 11 and 12 in a cylindrical housing 13; a drum 14, positioned on one end of the shaft and having an annular line-receiving groove 15 in one end; a clutch, including pistons 16 and 17 in cylinders 18 and 19, respectively, on one end of the shaft; a connection 20 for admitting fluid under pressure to the cylinders; shoes 21 and 22, positioned to frictionally engage a cylindrical portion 23 of the drum when it is desired to rotate the cam by a line 24 wrapped around the drum; a cam 25, carried by the end of the shaft 10 opposite to the end on which the drum assembly and clutch are positioned; a roller 26, mounted in one end of a lever 27 and positioned to ride on the surface of the cam 25; a link 28, pivotally connected at one end, by a pin 29, to the extended end of the lever 27 and, at the opposite end, by a pin 30, to a lever 31, pivotally mounted by a pin 32 and positioned with an extended end attached to an arm 33 of a scribe 34, the arm being pivotally mounted between rollers 35 and 36 in a U-shaped bracket 37.

The fluid pressure connection 20 extends through a head 38 on the open end of the cylindrical portion 23 of drum 14, the head being provided with flange 39 that extends over the end of the portion 23.

The shoes 21 and 22 of the clutch assembly are carried on ends of piston rods 40 and 41, and the pistons, with the piston rods and shoes, are retracted or urged inwardly, when fluid pressure of connection 20 is relieved, by springs 42 and 43, inner ends of which bear against the pistons and outer ends of which are held by yokes 44 and 45 of a bracket 46. The drum 14 is rotatably mounted on the shaft 10 by a bearing 47.

With line 24 wrapped around drum 14 and positioned in groove 15, the drum is free to rotate without rotating the shaft 10 and cam 25, and when it is desired to use the measuring attachment or instrument, fluid under pressure is supplied through the connection 20 to the cylinders 18 and 19, whereby the shoes 21 and 22 are forced outwardly, locking the drum to the shaft and causing the shaft and cam to rotate with the drum.

Figure 2:
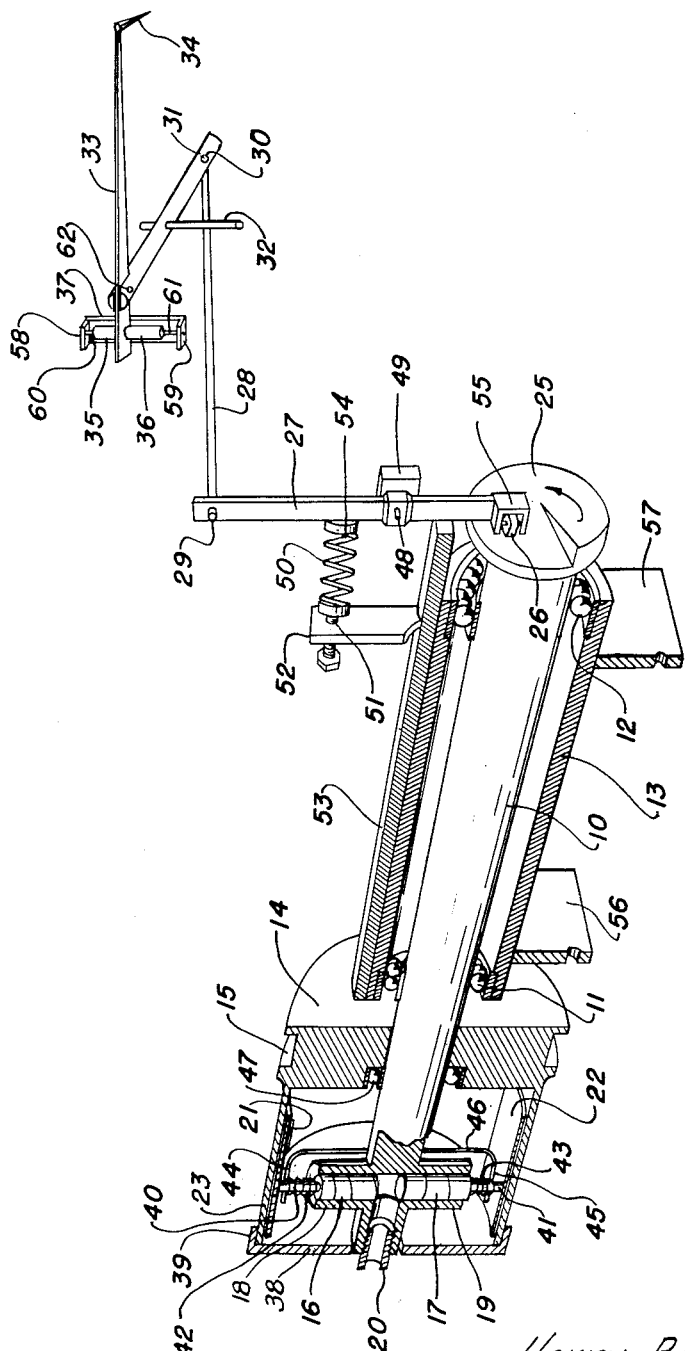
FIGURE 2 is a perspective view of the instrument shown in FIGURE 1, with longitudinal sections through the drum and cam assemblies and with the recording tape omitted.

Upon rotation of shaft 10 and cam 25 in an anticlockwise direction from the right-hand end of the shaft, with the parts as shown in FIGURE 2, the lower end of the lever 27 moves outwardly with the upper end moving in the opposite direction drawing the rod 28 toward the left, whereby the arm 31 is pivoted about the pin 32, and the scribe or pointer 34 is actuated across the graph or tape. Lever 27 is pivotally mounted by a pin 48 on a bearing 49, and the upper part of the lever is urged outwardly, holding roller 26 against the cam surface by a spring 50, one end of which is held by a washer on the end of an adjusting screw 51 threaded in a post 52 mounted on a bar 53 positioned on the upper side of the cylinder 13. The opposite end of the spring 50 is retained in position by a pin 54 extended from the lever 27. The lower end of the lever 27 is provided with a yoke 55, in which the roller 26 is rotatably mounted.

The cylinder 13 is mounted on supports 56 and 57, whereby the shaft is retained in a horizontal position. The height of the supports 56 and 57 is such that the drum 14 is spaced above a surface upon which the instrument is mounted.

The arm 33, on the outer end of which the pointer 34 is carried, is mounted between the rollers 35 and 36 of the U-shaped bracket 37, and the rollers are pivotally mounted in flanges 58 and 59 of the bracket 37 by pins 60 and 61; and the end of the lever 31 is pivotally connected to the arm 33 by a pin 62, at a point spaced from the rollers 35 and 36.

The bracket 37, in which the rollers 35 and 36 are mounted, is positioned on a stand 63, and a spool 67 and time clock controlled spool 65, upon which the tape or graph 66 is positioned, are mounted on an extension 64 of the stand.

Scribe 34 is positioned to mark on a graph or elongated tape 66 extended from the spool 67 and trained over the time clock controlled spool 65 against which the tape is held by an idler roller 68.

In use, the instrument is positioned so that the upper end of the cable 24 may be attached to a spring-loaded reel, and the lower end connected to a moving object, whereby, with the drum free to rotate on the shaft, the cable may be drawn in either direction, and, with pressure applied to the cylinders of the clutch assembly, the drum is locked to the shaft, whereby, upon downward movement of an object to which a cable is connected, the drum, shaft, and cam are rotated, causing the scribe or pointer 34 to operate across the graph or tape 66. With the cam formed as illustrated and described, each revolution thereof causes the scribe to move across the tape, indicating one foot of travel of the cable since the circumference of the annular line-receiving groove 15 is exactly one foot. By this means, the downward travel of a drill or well string in a well is indicated on the graph or tape, whereby the exact position of breaks and also of objects in the well may readily be determined.

The parts are readily adjustable, so that the distance of travel of a cable or other object may readily be recorded on the graph or tape.

It will be understood that modifications, within the scope of the appended claims, may be made in the design and arrangement of the parts without departing from the spirit of the invention.

What is claimed is:

1. A measuring instrument, comprising a shaft having a cam thereon, means for rotatably mounting the shaft, a cable drum freely mounted on the shaft, a clutch for connecting the drum to the shaft, means for actuating the clutch from a remote point, a scribe, and means for actuating the scribe by the cam.

2. A measuring instrument, comprising a shaft, means for rotatably mounting the shaft, a cam carried by the shaft, a drum rotatably mounted on the shaft, a clutch positioned for connecting the drum to the shaft, means for actuating the clutch from a remote point, a graph, a scribe positioned to mark on the graph, and levers operatively connecting the scribe to the cam whereby the scribe is actuated by the cam for marking on the graph.

3. In a measuring instrument, the combination which comprises a horizontally disposed shaft, means for rotatably mounting the shaft, a cam carried by the shaft, a cable-receiving drum also carried by the shaft, a clutch for operatively connecting the drum to the shaft, fluid pressure means for actuating the clutch from a remote point, a graph, a scribe positioned to mark on the graph, a lever having a roller in one end positioned to travel on the cam of the shaft, and means operatively connecting the lever to the scribe for actuating the scribe to mark on the graph.

4. In a footage-measuring instrument, the combination which comprises a shaft; means for rotatably mounting the shaft in a horizontal position; a cam carried by the shaft; a cable-receiving drum, mounted on the shaft and free to rotate thereon; a fluid-actuated clutch, carried by the shaft and positioned in the drum, the clutch having shoes positioned to be extended by fluid pressure in cylinders of the shaft; a connection through which fluid under pressure is supplied to the cylinders of a shaft; a lever, positioned normal to the axis of said shaft and having a roller in one end positioned to travel on said cam; resilient means for actuating the lever to urge the roller against the cam; a time clock actuated tape; a pivotally mounted scribe positioned to mark on the tape; a pivotally mounted lever connected to the scribe; and a link, connecting the pivotally mounted lever connected to the scribe to the lever in one end of which the roller is positioned.

5. A measuring instrument as described in claim 4, wherein the shaft is mounted by bearings in a cylindrical housing, a bar mounted on said housing and extending longitudinally thereof, a post secured to said bar at one end thereof and extending upwardly therefrom, supports for mounting said housing at a predetermined height above a supporting surface, and the spring for actuating the lever with the roller in the end thereof is carried by the post extended upwardly from the bar on the housing.

References Cited in the file of this patent

UNITED STATES PATENTS

| | | |
|---|---|---|
| 2,326,219 | Hayward | Aug. 10, 1943 |
| 2,756,506 | Scivally | July 31, 1956 |